United States Patent [19]
Handlin, Jr. et al.

[11] Patent Number: 5,594,072
[45] Date of Patent: Jan. 14, 1997

[54] LIQUID STAR POLYMERS HAVING TERMINAL HYDROXYL GROUPS

[75] Inventors: Dale L. Handlin, Jr.; Carl L. Willis, both of Houston; Daniel E. Goodwin, Katy; David J. St. Clair, Houston, all of Tex.

[73] Assignee: Shell Oil Company, Houston, Tex.

[21] Appl. No.: 510,022

[22] Filed: Aug. 1, 1995

Related U.S. Application Data

[63] Continuation of Ser. No. 303,560, Sep. 9, 1994, which is a continuation of Ser. No. 85,224, Jun. 30, 1993, abandoned.

[51] Int. Cl.⁶ .................................................. C08F 297/02
[52] U.S. Cl. ........................................................ 525/314
[58] Field of Search ................................ 525/314, 271, 525/250

[56] References Cited

U.S. PATENT DOCUMENTS

| | | | |
|---|---|---|---|
| Re. 27,145 | 1/1964 | Jones et al. ................. | 525/314 |
| 3,280,084 | 10/1966 | Zelinski et al. ............. | 525/271 |
| 3,507,934 | 4/1970 | Minor et al. ................ | 525/271 |
| 3,652,732 | 3/1972 | Makowski et al. .......... | 525/289 |
| 3,661,873 | 5/1972 | Halasa et al. ............... | 525/244 |
| 3,719,730 | 3/1973 | Hansley et al. ............. | 525/123 |
| 3,755,276 | 8/1973 | Oldack et al. ............... | 525/244 |
| 3,851,000 | 11/1974 | Selman et al. .............. | 525/366 |
| 3,862,097 | 1/1975 | Milkovich et al. .......... | 528/392 |
| 3,862,251 | 1/1975 | Strecker ...................... | 526/173 |
| 3,949,020 | 4/1976 | Prudence .................... | 525/314 |
| 3,959,412 | 5/1976 | Oberlin ....................... | 525/271 |
| 3,976,628 | 8/1976 | Halasa et al. ............... | 525/366 |
| 3,978,160 | 8/1976 | Seiler et al. ................. | 525/385 |
| 3,985,830 | 10/1976 | Fetters et al. ............... | 525/271 |
| 4,010,226 | 3/1977 | Crossland et al. .......... | 525/271 |
| 4,304,886 | 12/1981 | Bean, Jr. et al. ............ | 525/314 |
| 4,370,433 | 1/1983 | Allison, III et al. ........ | 524/474 |
| 4,444,953 | 4/1984 | St. Clair ...................... | 525/98 |
| 5,061,758 | 10/1991 | Hellermann et al. ........ | 525/193 |
| 5,070,131 | 12/1991 | Rhodes et al. .............. | 524/484 |
| 5,166,277 | 11/1992 | Goodwin et al. ............ | 525/338 |
| 5,229,464 | 7/1993 | Erickson et al. ............ | 525/314 |
| 5,242,989 | 9/1993 | Bening et al. ............... | 525/384 |
| 5,247,026 | 9/1993 | Erickson et al. ............ | 525/314 |
| 5,300,586 | 4/1994 | Bening et al. ............... | 525/332.8 |
| 5,393,843 | 2/1995 | Handlin, Jr. et al. ....... | 525/332.8 |

FOREIGN PATENT DOCUMENTS 716645  8/1965  Canada .

*Primary Examiner*—Mark Warzel

[57] ABSTRACT

Star polymers of isoprene or butadiene having terminal hydroxyl groups have reduced viscosity when the hydroxyl groups are located on polymeric arms that are grown from the core of the star molecules. The polymers are useful in making coatings, sealants, and binders.

7 Claims, No Drawings

LIQUID STAR POLYMERS HAVING TERMINAL HYDROXYL GROUPS

This is a continuation of application Ser. No. 08/303,560, filed Sep. 9, 1994, which is a continuation of application Ser. No. 08/085,224 filed Jun. 30, 1993 now abandoned.

FIELD OF THE INVENTION

This invention relates to diene based star polymers suitable for crosslinking and to adhesive, sealant, and coating compositions made from the star polymers.

BACKGROUND OF THE INVENTION

Diene based polymers having low viscosity can be used without solvents to make coatings and related compositions as disclosed in several United States Patents. For unsaturated 1,3-butadiene polymers it is known that high 1,4-addition obtains low viscosity as taught in U.S. Pat. Nos. 4,518,753 and 3,652,732. However, when the polymers described in these patents are hydrogenated the products are crystalline solids. Such a crystalline hydrogenated diene polymer having terminal hydroxyl groups is available from Mitsubishi and is designated POLYTAIL H polymer which has a melting point of 72° C.

The hydrogenated butadiene polymers are non-crystalline when the 1,4-addition of butadiene is below 70% as stated in U.S. Pat. No. 4,020,125. The non-crystalline hydrogenated butadiene polymers are viscous liquids at low molecular weights as described in U.S. Pat. Nos. 4,866,120 and 4,020,125. POLYTAIL HA polymer produced by Mitsubishi and NISSO GI-2000 polymer produced by Nippon Soda are commercial examples of low molecular weight hydrogenated butadiene polymers which have terminal hydroxyl groups and 1,4-addition of about 16%.

Star polymers having three or more polymeric arms of a diene connected to a central nucleus are known in the art as described in Canadian Patent No. 716,645 and U.S. Pat. No. 3,985,830. The star polymers are also useful as low viscosity components for coatings as evidenced by the fact that several diene polymers described in Example 3 of U.S. Pat. No. 3,652,732 are inherently mixtures of star diene polymers and linear diene polymers. The star diene polymers facilitate crosslinking of the diene polymers. However, the diene polymers have at least 80% 1,4-addition and are crystalline solids after hydrogenation.

The termination of living anionic polymers to form functional end groups useful for adhesives, sealants, and coatings is described in U.S. Pat. Nos. 4,417,029, 4,518,753, and 4,753,991. Capping of anionic polymers with hydroxyl, carboxyl, amine, epoxy, and phenolic groups is known. Of particular interest for the present invention are diene polymers having terminal functional groups for production of coatings.

It is an object of the present invention to provide star diene polymers having terminal functional groups and low viscosity at room temperature. It is also an object of the invention to use the low viscosity polymers to make coatings and other high molecular weight polymers.

SUMMARY OF THE INVENTION

The present invention provides relatively high molecular weight diene polymers having a compact star structure with terminal hydroxyl groups and low viscosity at room temperature. Linear blocks of the polymerized diene having a peak molecular weight (Mp) from 400 to 40,000 are combined in a star polymer component having a peak molecular weight of at least 30,000. The star polymer has an average of at least two terminal hydroxyl groups per molecule.

The star polymers crosslink through at least some of the hydroxyl groups and are useful as rapid curing and heat stable adhesives, sealants, coatings, flexible printing plates, fibers and films, or as modifiers for asphalt, polyesters, polyamides, polyurethanes, and epoxies.

DETAILED DESCRIPTION OF THE INVENTION

The polymers of the invention comprise blocks or segments of a conjugated diene that are connected in a star structure with at least two terminal hydroxyl groups per molecule, wherein the peak molecular weight of each diene block is from 400 to 40,000 as measured by Gel Permeation Chromatography (GPC), and the peak molecular weight of the star molecules is at least 30,000 as measured by light scattering.

The polymers are produced by addition of hydroxyl groups to living star polymer structures containing anionically polymerized conjugated diene blocks or segments having terminal lithium groups. The living star polymers have the following generic formula:

(I)

wherein each A is a block or segment comprising a preponderance of a polymerized conjugated diene, q is from 2 to 30 and represents the number of polymeric arms having terminal lithium groups, and $(Li-)_s-Y-(-B)_r$ is the residue of a polylithium initiator wherein B is the residue of a monolithium polymer having the general structure B-Li, Y is a crosslinked core comprising a compound having at least two independently polymerized vinyl groups, r>q, and s=(r−q).

Each A block or segment in the structure of Formula I preferably comprises at least 90% by weight of the polymerized conjugated alkadiene. Most preferably, the A segments or blocks are homopolymeric. The conjugated alkadienes preferably have up to 8 carbon atoms. Illustrative of such conjugated alkadienes are 1,3-butadiene (butadiene), 2-methyl-1,3-butadiene (isoprene), 1,3-pentadiene (piperylene), 1,3-octadiene, and 2-methyl-1,3-pentadiene. Preferred conjugated alkadienes are butadiene and isoprene, particularly butadiene.

The anionic polymerization of the conjugated diene hydrocarbons is typically controlled with structure modifiers such as diethyl ether or glyme (1,2-diethoxyethane) when the polymer is to be hydrogenated to improve thermal stability. As described in Re 27,145 which is incorporated by reference herein, the level of 1,2-addition of a butadiene polymer or copolymer can greatly affect elastomeric properties after hydrogenation.

The 1,2-addition of 1,3-butadiene polymers having terminal functional groups influences the viscosity of the polymers as described in more detail below. A 1,2-addition of about 40% is achieved during polymerization at 50° C. with about 6% by volume of diethylether or about 1000 ppm of glyme.

Monolithium polymers having the structure B-Li are generally prepared by anionic polymerization of an alkenyl aromatic hydrocarbon, a conjugated diene, or an alkyl methacrylate with a monolithium compound to produce living polymers having a peak molecular weight from 1,500 to 15,000. Preferably, the monolithium polymer is a conjugated diene polymer having a peak molecular weight from 3,000 to 7,000, as measured by GPC.

Monolithium compounds for making the structure B-Li are preferably alkyllithiums having from 4 to 6 carbon atoms. Most preferably the monolithium compound is sec-butyllithium.

The alkenyl aromatic hydrocarbons used to prepare the monolithium polymers, or possibly included in the A blocks or segments, are hydrocarbon compounds of up to 18 carbon atoms having an alkenyl group of up to 6 carbon atoms attached to a ring carbon atom of an aromatic ring system of up to 2 aromatic rings. The preferred alkenyl aromatic compounds have an alkenyl group of up to 3 carbon atoms attached to a benzene ring as exemplified by styrene and styrene homologs such as styrene, α-methylstyrene, and p-methylstyrene. Styrene and α-methylstyrene are particularly preferred alkenyl aromatic compounds, especially styrene.

The alkyl methacrylates used to prepare the monolithium oligomers or monolithium polymers have from 4 to 8 carbon atoms in the alkyl groups. The preferred alkyl methacrylate is t-butyl methacrylate which is anionically polymerized as described in U.S. Pat. No. 5,002,676, which is incorporated herein by reference.

Monolithium compounds, oligomers and polymers form a polylithium initiator by crosslinking the core Y which comprises a compound having at least two independently polymerized vinyl groups. Examples of compounds having two or more vinyl groups that independently polymerize include divinylsilane, divinylbenzene, trivinylbenzene, and tetravinylsilane. Compounds having one vinyl group, such as styrene, or two conjugated vinyl groups, such as butadiene and isoprene, may be polymerized with or prior to the compound having two or more independent vinyl groups as long as the compounds crosslink into a core Y having at least three active lithium sites.

The living star polymers are preferably terminated with hydroxyl groups by reaction with ethylene oxide, a protected hydroxystyrene monomer, or ethylene oxide followed by addition of epichlorohydrin. Termination with ethylene oxide is most preferred and results in addition of aliphatic hydroxyl groups at the lithium sites and release of fine particles after neutralization as described in U.S. Pat. No. 5,166,277 which is incorporated by reference herein. The fine particles interfere with hydrogenation of the polymer and preferably are removed prior to hydrogenation.

Hydrogenation of at least 90%, preferably at least 95%, of the unsaturation in the A blocks or segments is achieved with nickel catalysts as described in U.S. Pat. Nos. Re. 27,145, 4,970,254, and 5,166,277 which are incorporated by reference herein. The preferred nickel catalyst is a mixture of nickel 2-ethylhexanoate and triethylaluminum described in more detail below.

Following addition of hydroxyl groups, the polymers of the invention have the following structure:

(II)

wherein each A is a hydrogenated or unsaturated block or segment comprising a preponderance of a polymerized conjugated diene having a peak molecular weight from 400 to 40,000 as measured by GPC, t is from 2 to 30 and represents the number of polymeric arms having terminal hydroxyl groups, and $(HO-)_u-Y-(-B)_r$ is the residue of a polylithium initiator wherein B is the hydrogenated or unsaturated residue of a monolithium conjugated diene polymer having a peak molecular weight from 1,500 to 15,000, Y is a crosslinked core comprising a compound having at least two independently polymerized vinyl groups, r>t, and 0<u<(r−t).

Star polymers having two or more terminal hydroxyl groups can be used with a minimum amount of solvents at room temperature when the viscosity of the polymer is less than about 5,000 poise. The hydroxyl groups capping arms grown from the core unexpectedly do not exhibit significant atomic attractions that would gel the star polymers. Hydrogenated butadiene polymers having a lower viscosity than 5,000 poise are produced by limiting the peak molecular weight to a range from 1,000 to 10,000 and by limiting the 1,2-addition to an amount between 40% to 60%.

The polymers of the present invention are useful in making adhesives (including pressure sensitive adhesives, contact adhesives, laminating adhesives and assembly adhesives), sealants, coatings, films (such as those requiring heat and solvent resistance), printing plates, fibers, and as modifiers for polyesters, polyurethanes, polyethers and polyamides. The polymers are also useful in asphalt modification. In addition to the star polymers and conventional curing aids or agents, products formulated to meet performance requirements for particular applications may include various combinations of ingredients including adhesion promoting or tackifying resins, plasticizers, fillers, solvents, and stabilizers.

Generally, if a hydrogenation step is used, sufficient improvement of the chemical and heat stability of the final product should be achieved to justify the extra expense and effort involved. For greatest heat stability, all of the olefinic double bonds (ODB), anyplace in the polymer, should be removed so that less than 1 Meq of ODB per gram of polymer remain, more preferably less than 0.6 Meq/g, and most preferably less than about 0.3 Meq/g of polymer.

Molecular weights of linear polydienes are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good analytical method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering.

DETAILED DESCRIPTION OF PREFERRED EMBODIMENTS

The polymers of the invention preferably comprise homopolymer blocks of hydrogenated butadiene that have Structure II with an average of from 2 to 10 terminal hydroxyl groups per molecule, wherein the peak molecular weight of each hydrogenated block A is from 500 to 3,000, the peak molecular weight of each hydrogenated block B is from 3,000 to 7,000, and the peak molecular weight of the star molecules is from 30,000 to 150,000.

The peak molecular weights of the hydrogenated butadiene blocks are very important for obtaining a low viscosity polymer for ease of application. The ranges of 500 to 3,000 and 3,000 to 7,000 are preferred because arms in this range will be at or very near the absolute minimum in viscosity.

EXAMPLE 1

A polymer was prepared having Structure II shown on page 7, where A and B were polybutadienes radiating from a divinylbenzene core (Y). We charged 1800 grams of cyclohexane into a clean, 1 gallon, stirred, stainless steel autoclave. In a glove box were weighed 120 grams of diethyl ether, 0.06 moles of sec-butyllithium, and 29.3 grams of an 80% divinylbenzene (DVB) solution (a mixture of meta and para isomers), into three separate pressure vessels. The ether and sec-butyllithium reagents were added to the autoclave under nitrogen pressure at 25°–30° C. Then 300 grams of 1,3-butadiene was added to the reactor in three 100 gram increments. Each increment was allowed to polymerize until the exotherm had subsided before the next increment was added.

After all of the butadiene was added, a sample of the polybutadiene (Sample I), was collected into a nitrogen purged bottle which contained methanol. The temperature of the reactor was increased to 50°–55° C. The divinylbenzene reagent was added under nitrogen pressure to the reactor. The coupling reaction was allowed to proceed for one hour. At this point, the solution was a bright orange-red. Another sample (Sample II), the DVB-coupled star polymer, was removed into a nitrogen-purged bottle containing methanol. After one hour of DVB reaction, 500 ppm of 1,2-diethoxyethane was added from a pressure vessel under nitrogen to the reactor, followed by 60 grams of butadiene. We allowed the final increment of butadiene to react 1.25 hours. A sample (Sample III), the "inside-out" star polymer, was taken into a nitrogen-purged bottle containing methanol. Dry ethylene oxide (65 grams, 1.47 mol), was added to the reactor from a lecture bottle. This mixture was allowed to stir several hours. We then added 5–10 ml of methanol to the reactor from a pressure vessel. A final sample of the polymer solution (Sample IV), the "inside/out" star polyol, was taken. Samples I–IV were retained for analysis for hydroxyl content and molecular weight by $^{13}$C NMR and gel permeation chromatography, respectively.

The peak molecular weight of Sample I was 4,300. The peak molecular weight of Sample II was 31,000, which indicates that the initial star polymer had approximately seven arms. The peak molecular weight of Sample III was 34,000 and analysis by $^{13}$C NMR showed 87% of the polybutadiene arms which coupled grew back out of the core in the second polymerization step. In other words, there were 87% of the still active lithium sites in the coupled divinylbenzene core which were available to initiate butadiene. Of the arms which grew back out, NMR analysis showed approximately 98% of those arms had a hydroxyl end group.

For hydrogenation, 2,000 grams of the star polyol cement were heated, in a 1 gallon, stainless steel autoclave, to 40° C., and briefly sparged with high pressure hydrogen. The reactor was sealed and pressured with high pressure hydrogen. An aliquot of preformed nickel/aluminum catalyst (2:1 Al/Ni) prepared from the reaction of nickel 2-ethylhexanoate and triethylaluminum, containing approximately 7,000 ppm nickel, was added to the reactor. The catalyst was prepared in a cyclohexane solution and 16 cc was added to the reactor. The reaction exothermed rapidly to 50° C. The pressure of hydrogen in the reactor was 800 psig. The pressure began to drop noticeably during the reaction. The experiment was continued by the addition, at regular intervals, of 16 cc aliquots of the nickel/aluminum catalyst. Each increment of catalyst added approximately 45 ppm of nickel to the reaction solution, and a total of 900 ppm nickel was added to the reaction solution. The reaction was continued for a total of five hours.

The maximum temperature of the reactor was 89° C. After five hours the heat was turned off, and the reactor was allowed to sit overnight under 500–600 psig of hydrogen. The reactor was then heated to 63° C. and we added 180 ppm more nickel. The maximum temperature of the reactor was 85.6° C., and we allowed the reaction to proceed for 7 hours.

After allowing the solution to cool, we placed it into a stirred glass vessel and contacted the solution with 1% aqueous sulfuric acid. Several washes were necessary to remove the black color from the polymer solution. A check of the polymer solution with test strips specific for Ni(2+) did not indicate the presence of nickel. The polymer solution was stripped of solvent and dried thoroughly. An analysis of the polymer using an ozonolysis technique revealed that the polymer contained 1.89 meq/g of residual unsaturation. This number corresponds to 90% saturation of the double bonds in the molecule. Analysis by $^{13}$C NMR revealed only 5% remaining unsaturation. Results are listed in Table 1.

EXAMPLE 2

An unsaturated star diol was made in a similar fashion to Example 1, using the same amounts of all reagents, except that a portion of the monolithium initiator was found to be inactive. Samples I–IV were taken during the experiment as in Example 1. The samples were analyzed for hydroxyl content and molecular weight by $^{13}$C NMR and gel permeation chromatography respectively, prior to hydrogenation.

The peak molecular weight (Mp) of Sample I was 13,000. The Mp of Sample II was 238,500, and the Mp of Sample III was 337,000. The star had approximately 18 arms, and $^{13}$C NMR showed that 17% of the lithium sites in the core initiated butadiene growth. Of the arms which grew out, 67% contained an hydroxyl end-group. Results are shown in Table 1.

This polymer could be hydrogenated using the same procedures described in Example 1 to give a saturated star diol.

EXAMPLE 3 (COMPARISON)

This example compares the results of the present invention to a star polyol which is produced in accordance with U.S. patent application Ser. No. 07/692,839, filed Apr. 29, 1991 (T-4797X).

The comparison radial polymer has the following structure

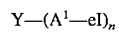

where Y is a divinylbenzene core, $A^1$ is polyethylene/butylene (hydrogenated polybutadiene), eI is epoxidized polyisoprene and n is 15–20. The arm molecular weight is approximately 3,900. The arm consists of a hydrogenated butadiene polymer attached to the DVB core on one end and attached to a 370 MW polyisoprene block on the other end. The overall molecular weight of the star polymer is approximately 85,000.

This polymer was made by making a star polymer with butadiene-isoprene arms, partially hydrogenating the polymer as described in Ser. No. 07/692,839 to fully hydrogenate the butadiene segments and partially hydrogenate the isoprene segments, and then epoxidizing the polymer as described in the '839 application to produce the above polymer which has 0.6 meq of epoxy groups in the isoprene segments. The polymer was reacted with alcohol and boron trifluoride diethyl etherate as follows:

The 25 grams of polymer was dissolved to 10% by weight in a mixture of 55% toluene, 30% cyclohexane, and 15% Solketal, the reactor was purged with nitrogen and a solution of boron trifluoride diethyl etherate in 15 milliliters of toluene was added dropwise at room temperature. Exotherms of 3° to 4° C. were observed. The solution was stirred at room temperature. The solution was then washed with an excess (150 volume percent) of aqueous sodium carbonate and then water, precipitated in isopropanol and then dried at 35°–50° C. under vacuum. Titrations for residual epoxy and $^1$H NMR analysis were performed. The catalyst (in the solvent) was added dropwise to the polymer and Solketal solution at room temperature. Fifteen minutes after all of the catalyst was added, the polymer cement was washed with dilute aqueous base and then water. The majority of the solvent was removed by evaporation in a hood and the polymer was further dried under vacuum.

The epoxidized star polymer was initially reacted under the conditions that had been most effective, namely 10% solids and 85:15 cyclohexane/toluene:Solketal at room temperature using boron trifluoride diethyl etherate as the catalyst. As expected, the analytical results were consistent with substantial conversion of epoxy groups to the ether-triol. Derivatization could also be accomplished by adding Solketal and catalyst to the washed cement (epoxidized polymer in the solvent in which it was epoxidized, usually cyclohexane). The dibutyl etherate was used as the catalyst since the diethyl etherate was insoluble in cyclohexane. There was no evidence of the residual water in the cement interfering with the reaction in any way.

Titration, $^1$H NMR, FTIR and GPC were performed as described previously. Spectroscopic results consistent with conversion to the ethertriol were obtained. Only about 10–20% dimer is formed and little, if any, higher coupled products as determined by GPC. The extent of reaction indicates that about 1.3–2 derivatized repeat units (DE) are present per arm (25–37 per molecule), that is about 4–6 hydroxyl groups per arm (75–112 per molecule), at least ⅓ of which are primary. Analytical results are shown in Table 1.

TABLE 1

| Viscosity of Hydroxylated Star Polymers | | | |
|---|---|---|---|
| Example | 1 | 2 | 3 (Comp.) |
| Peak Molecular Weights | | | |
| Uncoupled Arms (Sample 1) | 4,300 | 13,000 | 3,900 |
| Unsaturated Star (Sample 3) | 34,000 | 337,000 | — |

TABLE 1-continued

| Viscosity of Hydroxylated Star Polymers | | | |
|---|---|---|---|
| Example | 1 | 2 | 3 (Comp.) |
| Partial Saturated Star Viscosity, Poise | — | — | 85,000 |
| Unsaturated Star (Sample 3) | 849 | 32,500 | — |
| Unsaturated Polyol/Diol (Sample 4) | —766 | 8,900 | — |
| Partial Saturated Star | — | — | 5,700 |
| Saturated Star Epoxy | — | — | 6,100 |
| Saturated Star Polyol | 10,000 | — | 27,700 |

It is well known that the addition of hydroxyl groups to hydrocarbon small molecules and polymers increases their viscosity through hydrogen bonding as shown in Comparative Example 3. The greater the number of hydroxyls per molecular weight, the greater the viscosity, e.g. ethylene glycol is much more viscous than ethanol which is much more viscous than ethane. In Comparative Example 3, the addition of non-hydrogen bonding epoxy groups to a typical star polymer increases the viscosity by only about 5%. However, the modification of the epoxy groups to form hydroxyl groups increases the viscosity by almost a factor of five as expected. Surprisingly, the addition of hydroxyl groups to the base star polymers in Examples 1 and 2 does not result in increased viscosity. In Example 2 there is a substantial reduction in the viscosity after the addition of hydroxyl groups. This unexpected result is apparently due to placement of hydroxyl groups on the cores of the star polymer molecules which promote intramolecular association of the hydroxyl groups on the ends of the polymeric arms. The special placement of the hydroxyls in polymers of Examples 1 and 2 therefore, gives them advantages both in their synthesis and in lower viscosity in the final product over typical star polymers containing hydroxyl groups such as Comparative Example 3.

EXAMPLE 4

A clear, elastomeric, two-component, ambient temperature curing, polyurethane coating was prepared with the star polyol of Example 1 as follows. MONDUR® MR (from Miles, Inc.) is an aromatic polyisocyanate having an NCO equivalent weight of 197. The hydroxyl equivalent weight of the star polyol was assumed to be 6,000.

| Composition, pbw | 1 |
|---|---|
| Star Polyol of Example 1 | 6,000 |
| MONDUR MR | 197 |
| Toluene | 429 |

First 6,000 parts by weight (pbw) of the star polyol were dissolved in toluene. Then, 197 pbw of MONDUR® MR was added and the coating was immediately applied onto steel panels (QD412 panels from Q-Panel Corp.). The solution gelled about 1 hour after adding the isocyanate. The coated panels were dried/cured 1 week at room temperature before testing. The dry film thickness of the coatings was about 50 microns. The composition gave a clear, soft, elastomeric coating having low adhesion. Composition 1 had the slight yellow color characteristic of aromatic isocyanates.

EXAMPLE 5

Clear, elastomeric coatings are prepared with the star polyol of Example 1 cured with a melamine resin in a bake-cured formulation as follows.

| Composition, % w | 1 | 2 | 3 |
|---|---|---|---|
| Star Polyol of Example 1 | 90 | 80 | 70 |
| CYMEL 303 | 9 | 18 | 27 |
| CYCAT 600 | 1 | 2 | 3 |

The compositions are prepared at 65% w solids content in a solvent blend containing 90% w xylene and 10% w n-butyl alcohol. The coatings are applied onto steel panels (QD412 panels from Q-Panel Corp) and are dried/cured for 20 minutes at 175° C. The following properties were measured.

| Property | 1 | 2 | 3 |
|---|---|---|---|
| Thickness, mil | 1.0 | 1.0 | 1.0 |
| Pencil Hardness | <4B | 3B | 1B |
| MEK Double Rubs | 60 | 40 | 30 |
| Crosshatch Adhesion | 5 | 5 | 3 |
| Gloss | High | High | Fair |
| Clarity | Clear | Opaque | Opaque |

Before baking, all coatings were very tacky, viscous liquids. After baking, all coatings were elastic solids having moderate MEK Double Rub Resistance, indicating that all coatings did indeed cure. Results show that the optimum level of melamine crosslinker is about 10–20 % w. Below 10% w, the coating will be very soft (pencil hardness <4B). Above 20% w, the coating will have limited adhesion (crosshatch adhesion <3) and lower gloss.

EXAMPLE 6 (HYPOTHETICAL)

The star polyol of Example 1 is reacted into an isocyanate crosslinker and this is used to crosslink an acrylic polyol, a polyester polyol and a polyether polyol to give rubber toughened coatings. The equivalent weights used in calculating the appropriate compositions are the following.

|  | Equivalent Weight |
|---|---|
| Star Polyol of Example 1 | 6,000 |
| DESMODUR Z-4370 | 365 |
| Acrylic Polyol | 500 |
| Polyester Polyol | 500 |
| Polyether Polyol | 500 |

The following compositions are prepared.

| Composition, % w | 1 | 2 | 3 |
|---|---|---|---|
| Star Polyol of Example 1 | 6.5 | 6.5 | 6.5 |
| DESMODUR Z-4370 | 39.3 | 39.3 | 39.3 |
| DBTDL | 0.2 | 0.2 | 0.2 |
| Acrylic Polyol | 54.0 |  |  |
| Polyester Polyol |  | 54.0 |  |
| Polyether Polyol |  |  | 54.0 |

First, 6.5 pbw of the star polyol of Example 1 are combined with 39.3 pbw of DESMODUR® Z-4370 (from Miles, Inc.) and 0.2 pbw dibutyl tin dilaurate (DBTDL) catalyst in a jar. This is mixed on a roller for several days to prepare the rubber modified, isocyanate crosslinker. The NCO/OH ratio in the rubber modified crosslinker was 100/1. Coatings are then prepared by adding 54 pbw of the acrylic polyol, the polyester polyol or the polyether polyol to the rubber modified, isocyanate crosslinker. The NCO/OH ratio in these coatings is 1/1. These two-component, clear coatings must be applied to the substrate fairly soon after combining the rubber modified crosslinker and the polyol since the pot life of the coating will be only several hours. The coatings will cure on the substrate to give hazy, rubber toughened, impact resistant coatings.

EXAMPLE 7 (HYPOTHETICAL)

A flexible crosslinker is prepared by reaction of the star polyol of Example 1 with isophorone diisocyanate (IPDI). This is then used to crosslink a polybutadiene diol (Bd-diol) or a hydrogenated polybutadiene diol (EB-diol) to give a polyurethane for use in sealants and binders. The equivalent weights used for the star polyol, IPDI and the Bd-diol or EB-diol are 6,000, 111, and 1,000, respectively.

The flexible crosslinker is prepared by combining 63.5 pbw of the star polyol of Example 1, 4.7 pbw of IPDI (from Hüls, Inc.) and 0.02 pbw of DBTDL in a resin kettle, heating at 80° C. and stirring for 4 hours under a dry nitrogen purge. IPDI is used at a 4/1 NCO/OH excess to prevent gellation during the reaction. The flexible crosslinker is then cooled to 50° C. and 31.8 pbw of either the Bd-diol or the EB-diol is added. After 5 minutes of mixing, the mixture is pumped into place where it cures to give an elastomeric sealant or binder. Other formulating ingredients (such as tackifying resins, plasticizers, fillers, stabilizers, propellants, etc.) can be added to the flexible crosslinker or to the diol prior to mixing of the two reactants.

EXAMPLE 8 (HYPOTHETICAL)

A moisture curing, clear, elastomeric coating is made from the star polyol of Example 1 terminated with hexane diisocyanate (HDI). The isocyanate terminated prepolymer is prepared by combining 94.7 pbw of the star polyol of Example 1 with 5.3 pbw of HDI (from Miles, Inc.) and 0.02 pbw of DBTDL in a resin kettle, heating to 80° C. and stirring for 4 hours under a dry nitrogen purge. HDI is used at a 4/1 NCO/OH excess to prevent gellation during the reaction. Unreacted excess HDI is removed by vacuum stripping to give the isocyanate terminated prepolymer. This prepolymer is diluted with 20 pbw of xylene and applied to aluminum. After aging at ambient conditions for 1 month, the prepolymer cures via ambient moisture to give a clear, elastomeric coating.

EXAMPLE 9 (HYPOTHETICAL)

A moisture curing, elastomeric formulation is prepared from the isocyanate terminated prepolymer of Example 8 as follows. The composition is made by mixing 100 pbw of the prepolymer of Example 8, 50 pbw toluene, 100 pbw of WINGTACK 95 hydrocarbon tackifying resin (from Goodyear) and 100 pbw of ATOMITE calcium carbonate (from Thompson Weiman) in a sigma blade mixer under a dry nitrogen blanket. It is required that the material be packaged with critical exclusion of moisture until the package is opened for use. The material is useful as a moisture curable, polyurethane/urea sealant, caulk or coating.

EXAMPLE 10 (HYPOTHETICAL)

An acrylate terminated prepolymer is prepared from the isocyanate terminated prepolymer of Example 8 as follows. 98.1 pbw of the prepolymer of Example 8, 1.9 pbw of hydroxy ethyl acrylate and 0.01 pbw of DBTDL are combined in a resin kettle, heated to 80° C. and stirred for 4 hours under a dry nitrogen purge to give the acrylate terminated polymer. This prepolymer is useful in coatings, sealants and adhesives which are cured by free radical processes, initiated for example by peroxides or radiation.

I claim:

1. A polymer, comprising:
the structure:

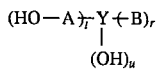

wherein each A is a hydrogenated or unsaturated block or segment comprising a preponderance of a polymerized conjugated diene having a peak molecular weight from 400 to 40,000 as measured by GPC, t is from 2 to 30, B is the residue of a hydrogenated or unsaturated monolithium conjugated diene polymer having a peak molecular weight from 1,500 to 15,000 as measured by GPC, Y is a crosslinked core comprising a compound having at least two independently polymerized vinyl groups, $r>t$, and $0<u<(r-t)$.

2. The polymer of claim 1, wherein each block A is hydrogenated 1,3-butadiene having a peak molecular weight from 500 to 3,000 and each B is hydrogenated 1,3-butadiene having a peak molecular weight from 3,000 to 7,000.

3. The polymer of claim 2, wherein each A block and each B is at least 90% hydrogenated.

4. The polymer of claim 3, wherein the 1,2-polymerization of the hydrogenated butadiene in each A block and in each B is between 40% and 60%.

5. The polymer of claim 4, wherein t is from 2 to 10.

6. The polymer of claim 5, wherein the peak molecular weight of the polymer molecule is from 30,000 to 150,000 as measured by light scattering.

7. The polymer of claim 6, wherein the polymer has a viscosity of 10,000 poise at room temperature.

* * * * *